United States Patent
Repko et al.

(10) Patent No.: US 7,385,990 B2
(45) Date of Patent: Jun. 10, 2008

(54) METHOD TO IMPROVE THE RESOLUTION OF TIME MEASUREMENTS AND ALIGNMENT IN PACKET NETWORKS BY TIME MODULATION

(75) Inventors: Willem L. Repko, Hilversum (NL); Robertus L. Van Der Valk, Capelle a/d IJssel (NL); Petrus W. Simons, Nieuwerkert a/d Ijssel (NL); Steven Roos, Delft (NL)

(73) Assignee: Zarlink Semiconductor Inc., Kanata (CA)

( * ) Notice: Subject to any disclaimer, the term of this patent is extended or adjusted under 35 U.S.C. 154(b) by 924 days.

(21) Appl. No.: 10/624,068

(22) Filed: Jul. 21, 2003

(65) Prior Publication Data

US 2005/0053076 A1    Mar. 10, 2005

(51) Int. Cl.
*H04L 12/28* (2006.01)
*H04L 7/00* (2006.01)
*H04J 3/06* (2006.01)
*G06F 1/12* (2006.01)

(52) U.S. Cl. ............ 370/395.62; 370/509; 375/356; 713/375

(58) Field of Classification Search .......... 370/395.62, 370/503, 509, 512, 516–518
See application file for complete search history.

(56) References Cited

U.S. PATENT DOCUMENTS

| | | | |
|---|---|---|---|
| 3,483,330 A | 12/1969 | Inose et al. | |
| 3,940,558 A | 2/1976 | Gabbard et al. | |
| 4,103,234 A * | 7/1978 | Frazier, Jr. | 375/360 |
| 4,339,817 A | 7/1982 | Hata et al. | |
| 4,513,415 A * | 4/1985 | Martinez | 370/312 |
| 4,530,091 A | 7/1985 | Crockett | |
| 4,961,188 A | 10/1990 | Lau | |
| 5,260,978 A | 11/1993 | Fleischer et al. | |
| 5,353,313 A | 10/1994 | Honea | |
| 5,469,466 A * | 11/1995 | Chu | 375/354 |
| 5,671,258 A * | 9/1997 | Burns et al. | 375/359 |
| 5,822,317 A * | 10/1998 | Shibata | 370/395.62 |
| 5,889,490 A * | 3/1999 | Wachter et al. | 342/127 |
| 6,101,195 A | 8/2000 | Lyons et al. | |
| 6,278,699 B1 * | 8/2001 | Atarius | 370/324 |
| 6,307,868 B1 * | 10/2001 | Rakib et al. | 370/485 |
| 6,426,947 B1 * | 7/2002 | Banker et al. | 370/254 |
| 6,665,308 B1 * | 12/2003 | Rakib et al. | 370/441 |
| 7,023,817 B2 * | 4/2006 | Kuffner et al. | 370/324 |

(Continued)

FOREIGN PATENT DOCUMENTS

EP    0565305 A1    10/1993

(Continued)

OTHER PUBLICATIONS

Kroupa, Venceslav F.; Spectra of Pulse Rate Frequency Synthesizers; Proceedings of the IEEE, vol. 67, No. 12, pp. 1680-1682, Dec. 1979; IEEE Press; New York, USA.

(Continued)

*Primary Examiner*—Wing Chan
*Assistant Examiner*—Hong Sol Cho
(74) *Attorney, Agent, or Firm*—Lawrence E. Laubscher, Jr.

(57) ABSTRACT

A method of recovering timing information in a packet network is disclosed wherein a modulation scheme is used to transport additional information required for clock recovery between the sender and receiver across the network.

18 Claims, 5 Drawing Sheets

U.S. PATENT DOCUMENTS

| | | | |
|---|---|---|---|
| 7,031,344 B2 * | 4/2006 | Rakib et al. | 370/479 |
| 2002/0015423 A1 * | 2/2002 | Rakib et al. | 370/485 |
| 2004/0223559 A1 * | 11/2004 | Hill | 375/306 |
| 2005/0265428 A1 * | 12/2005 | McCorkle | 375/130 |

FOREIGN PATENT DOCUMENTS

| | | |
|---|---|---|
| EP | 0537689 B1 | 1/2000 |
| GB | 2307139 A | 5/1997 |
| JP | 11088314 A | 3/1999 |
| JP | 2003060649 A | 2/2003 |
| WO | WO 98/05139 | 2/1992 |
| WO | 9962226 A1 | 12/1999 |
| WO | 0011831 A2 | 3/2000 |

OTHER PUBLICATIONS

Candy, James C. and Temes, Gabor C.; Oversampling Delta-Sigma Data Converters Theory, Design and Simulation; Reprints of Articles from Various IEEE Publications, 1962-1990, 1992, IEEE Press; New York, USA.

Elson, Jeremy; Girod, Lewis; Estrin, Deborah; "Fine-Grained Network Time Synchronization Using Reference Broadcasts"; Proceedings of the Fifth Symposium on Operating Systems Design and Implementation; Dec. 2002; pp. 1-17; Boston, USA.

* cited by examiner $X_{i,j} := i \quad Y1_{i,j} := j \quad Y2_{i,j} := \frac{32}{32} \cdot j$ $X_{i,j} := i \quad Y1_{i,j} := j \quad Y2_{i,j} := \frac{32}{31} \cdot j$ $X_{i,j} := i \quad Y1_{i,j} := j \quad Y2_{i,j} := \frac{32}{27} \cdot j$ $X_{i,j} := i \quad Y1_{i,j} := j \quad Y2_{i,j} := \frac{32}{24} \cdot j$ $$X_{i,j} := i \quad Y1_{i,j} := j \quad Y2_{i,j} := \frac{32}{16} j$$

$$X_{i,j} := i \qquad Y1_{i,j} := j \qquad Y2_{i,j} := \frac{32}{32} \cdot j + \frac{i}{32}$$

METHOD TO IMPROVE THE RESOLUTION OF TIME MEASUREMENTS AND ALIGNMENT IN PACKET NETWORKS BY TIME MODULATION

FIELD OF THE INVENTION

This invention relates to the field of digital communications, and in particular to a method of and apparatus for improving the resolution of time measurements in a packet network.

BACKGROUND OF THE INVENTION

There is a current trend for telecommunications and data technologies are nowadays to merge into a single environment, largely due to cost aspects. The preferred technology seems employs asynchronous networks, probably mainly due to market penetration, rather than the fact that asynchronous networks offer a higher quality solution. One particular aspect of asynchronous networks which creates problems for telecommunication services is the lack of accurate clock transport.

There are a number of mathematical ways to solve the problem. Typical solutions used are based upon averaging, weighting, line fitting and combinations thereof. Still the final resolution remains limited due to a number of problems in the network. The nature of these problems is such that current models of networks and current implementations are not accurate enough to deal with the effect of time quantizers. Network models concentrate on probabilities and thus act as if the time base is continuous, which is not a correct assumption.

Various prior art solutions are described in, for example, U.S. Pat. No. 5,260,978, Fleisher et al., Synchronous residual time stamp for timing recovery in a broadband network; UK Patent App #: 0205350.2, Gordon J. Reesor, Clock synchronization over a packet network using SRTS without a common network clock; Fine Grained Network Time Synchronization using reference broadcasts, Jeremy Elson, Lewis Girod and Deborah Estrin, internet publication, mail addresses {jelson,girod,destrin}@cs.ucla.edu; Alignment of clock domains in packet networks, patent application, W. L. Repko et al.; Spectra of pulse rate frequency synthesizers, Venceslav F. Kroupa, app. In Direct Digital Frequency synthesis, IEEE, ISBN 0-7803-3438-8; and Oversampling Delta-Sigma Data Converters, Theory, Design and Simulation, James C. Candy, Gabor C. Temes, IEEE Press, ISBN 0-87942-285-8. The above documents are herein incorporated by reference in their entirety.

Clock alignment in packet networks requires the transport of a real time clock signal over a network. The goal in data networks, which is the main source for the emergence of asynchronous networks, is of course primarily to transport data, not time. The techniques used in asynchronous networks introduce time problems that typically appear as variable time delays. A common model of these delays assumes that they are pseudorandom. In fact the nature of the delays is more complex, and is built up of a number of error types and magnitudes.

Asynchronous networks are built up with elements that run on their own clocks. The clocks are typically generated with the help of crystals in order to provide reasonable stability. Digital circuits require cycle-to-cycle stability to guarantee setup and hold times. External interface clocks are derived from a crystal clock. This implies that the time quantization is defined by the crystal, which makes it also relatively stable for longer periods. If two of these clocks sample in series the effective difference of sampling frequencies can be relatively large, but it can also be quite small. The latter case leads to low frequency errors in the overall behaviour of the system.

Switches and routers have elements that can handle the statistical properties of traffic, for example queues. Such elements introduce delays, depending on other traffic passing through the switch/router, or internally generated traffic (typically management traffic). This delay is typically pseudo random, for it depends on other traffic streams that operate in their own environments.

Modern switches or routers have internal systems that sometimes rearrange the precise operation of the switch. For instance the priority of queue handling can be changed. This becomes even more apparent when the switching configuration becomes complex. Rerouting of traffic for instance implies relative large jumps in delay. Depending on precise operation the delay variation can either be very structured, for instance as a result of repetitive timed updating, or pseudo random, if it largely depends on other streams.

In the switch there may be processes with low frequency aspects, such as regular internal maintenance. Such internal operations may have some impact on the effective delays. This becomes much more complex if these delays appear at slightly different frequencies in subsequent nodes.

The appearance of a network of switches and terminators is a mixture of all of the above effects. When coarsely observed the queueing delays are dominant, which explains the standard approach with pseudo random models. When a closer look is taken it will appear that some regularity is present. A first level could be the effect of internal operations, and a finer level could be the quantizer level caused by the physical clocks in the elements. At the smallest level of detail the thermal noise will become apparent.

Next to the size of the delays, the different effects introduce their own typical problems. The queueing delays may be pseudo random in time, but are likely dominated with a few sizes that relate to the typical packet sizes. Thus the queueing delays may also carry a few typical frequencies of delay variation. More interesting are the structured elements. Delay variation due to internal management will be seen on relatively low frequencies, clock offsets can be on either very low frequencies (if the clock difference is small) or on much higher frequencies (for larger clock differences).

In order to get the best possible performance a clock recovery method should be able to deal with all these effects. Existing solutions concentrate on the coarse level, not on the finer levels, and provide solutions for his coarser level. Typically such solutions rely on the relative stability of local oscillators, compared to the behaviour of the network in-between. The knowledge of the stable local oscillators is a minimum requirement for decent suppression of the pseudo random effects. But when such a solution for those levels is available, the first next level of problems becomes apparent and dominant. Thus the quantizing level as introduced by the clocks in the network become dominant, for which the pure stability of the local oscillators at the end nodes does not provide a sufficient solution

SUMMARY OF THE INVENTION

This invention focuses on the levels of quantization that occur in the elements of the network. It relies on stability of local clocks, but adds a property at the sending side that can be deployed for improving accuracy of recovery at the receiving side.

At the finest level, thermal noise, can only be handled with normal averaging, and is relatively so small that it has insignificant impact.

The invention concentrates on the precise nature of the time quantizers, and presents a simple and elegant solution to the problem in the form of modulation of timestamped packets or events.

According to the present invention there is provided a method of recovering timing information in a packet network, wherein a modulated signal is used to transport additional information required for clock recovery between the sender and receiver across the network.

The modulation may take the form of a variation in the rate of sending out packets.

The complete set of delays can be split into a pseudorandom part and a structured part. While prior art solutions exist that can handle the pseudorandom problems in clock transport over an asynchronous network, they are limited to the level of the structured problems. The reason is that the structured elements may have very low frequency aspects, which are difficult to handle well. The invention adds modulation as a piece of information. This can be regarded as analogous to the pilot tone that is used in radio frequency modulation (FM). The size and frequency aspects of the added modulation are the important parameters that can influence the performance of the system.

In most practical systems the modulation will be either shared as one of many continuously transported parameters used to perform the synchronization communication (so dynamic), or one setting that is transported and left to be constant (semi-static), or is inherently set in the method, be it hardware or software (static). It will be clear that for many reasons the first alternative is generally the most attractive, but there may be limitations in the solution space, such as available power, that suggest one of the others.

The invention further provides an apparatus for recovering timing information across a packet network at the receiver comprising a modulator at the sender for sending a modulated signal across the network conveying timing information; and a clock recovery unit at the receiver using said modulated signal to improve the accuracy of the recovered clock.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

First the nature of the structured quantization effects will be discussed. In a first example, suppose in packet network there are only two Ethernet cards with a crosslink in-between, i.e. with no switches/routers. In such an environment it is not difficult to avoid quantization problems; a simple PLL can recover the frequency from one card and slave the other card. This PLL will force the clocks to be identical to each other in such a way that the delay variation becomes very small. However, over many nodes this approach is not feasible, for it denies the possibility of having switches with individual, independent clocks, in-between. A PLL provides a synchronous detection scheme, but that cannot be enforced over many quantizing nodes unless each node performs a synchronous detection scheme.

Figure 1:
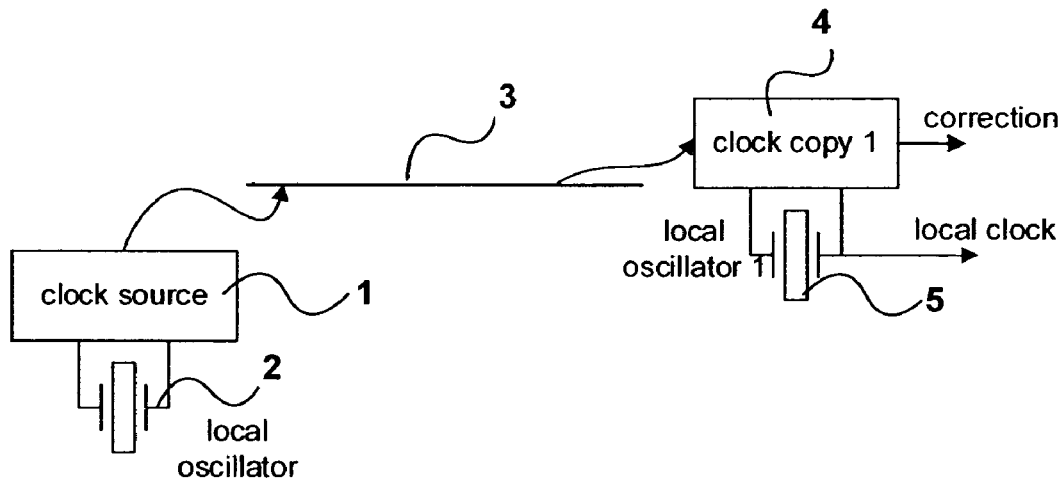
FIG. 1 illustrates a sender and receiver communicating over an Ethernet network.

In FIG. 1, a clock source 1 with local oscillator 2 at the near end communicates with a clock copy unit 4 associated with a local oscillator 5 at the far end over network link 3. The correction term can be used to close a PLL loop, and the local sampling clock becomes synchronous to the clock source local oscillator signal. Without this feedback, synchronous detection is not possible.

Figure 2:
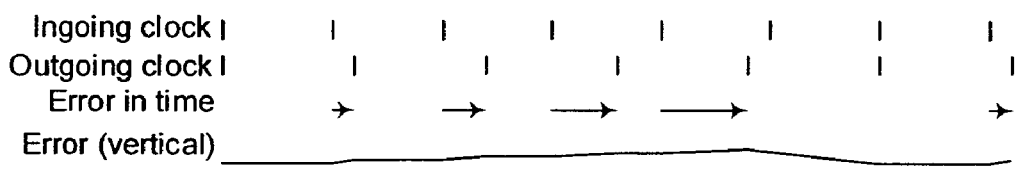
FIGS. 2, 3 and 4 are timing charts for various ingoing and outgoing clock timings.

If two clocks run independently, but more or less at the same frequency, the last sampling clock will determine when the signal will effectively become available, but the first clock will determine when the clock is 'offered', as shown in FIG. 2. Thus the error in timing can be established.

The last line in FIG. 2 shows the error on the y-axis, as function of time when the two clocks are quite close to each other. The ingoing clock (ingoing for the async channel) is at a higher frequency than the outgoing clock (outgoing meaning sampling on the output of the async channel), which creates potential problems of undersampling, which can be seen in the righthand side of the figure.

Figure 3:

FIGS. 3 shows what happens in the case of clocks are not that close to each other, but have a frequency ratio of 2:1 and 1:2 respectively. FIG. 3 has many places where subsampling problems would occur. Making the outgoing clock of higher frequency yields the result shown in FIG. 4, which no longer suffers from the subsampling problem.

Figure 4:
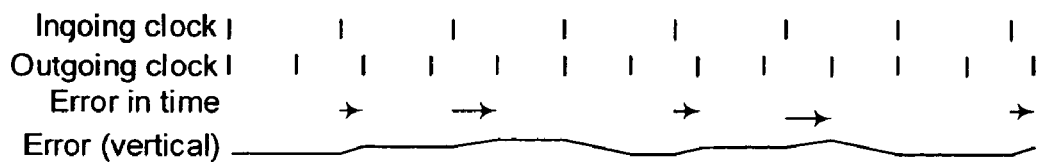
Figure 5A:
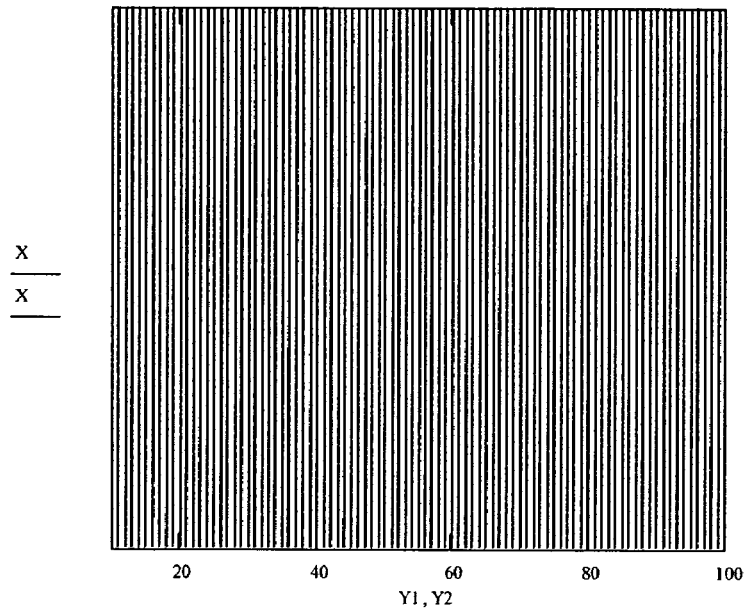
FIG. 5a to 5e are Moiré patterns.
Figure 5B:
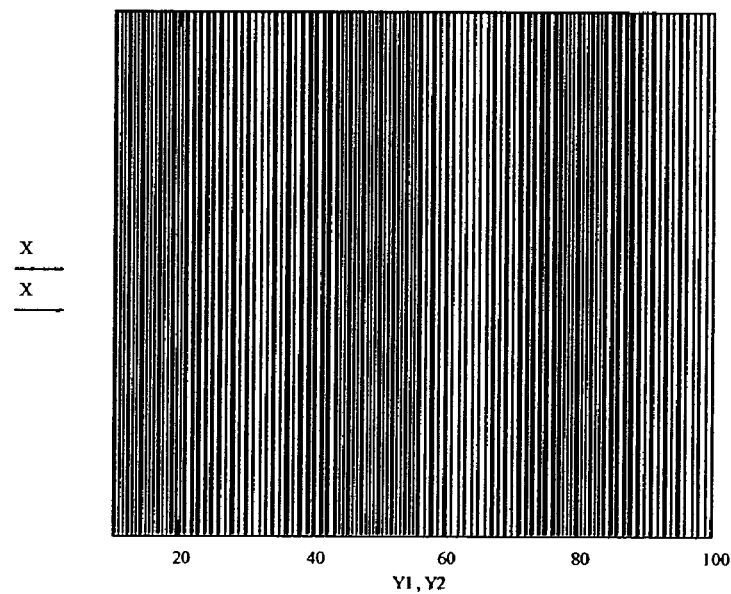
Figure 5C:
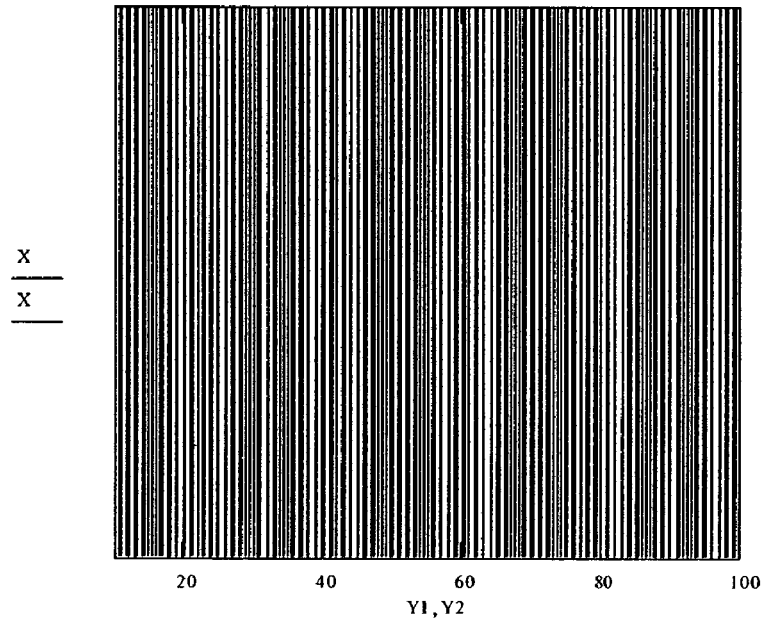
Figure 5D:
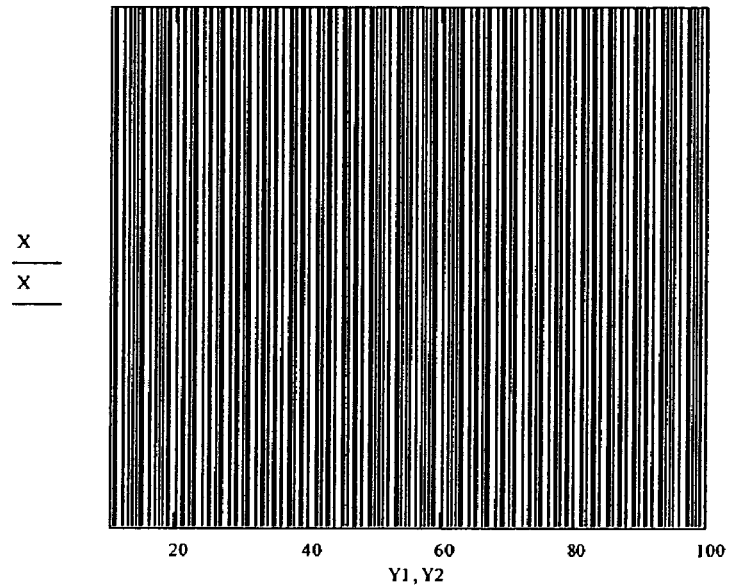
Figure 5E:
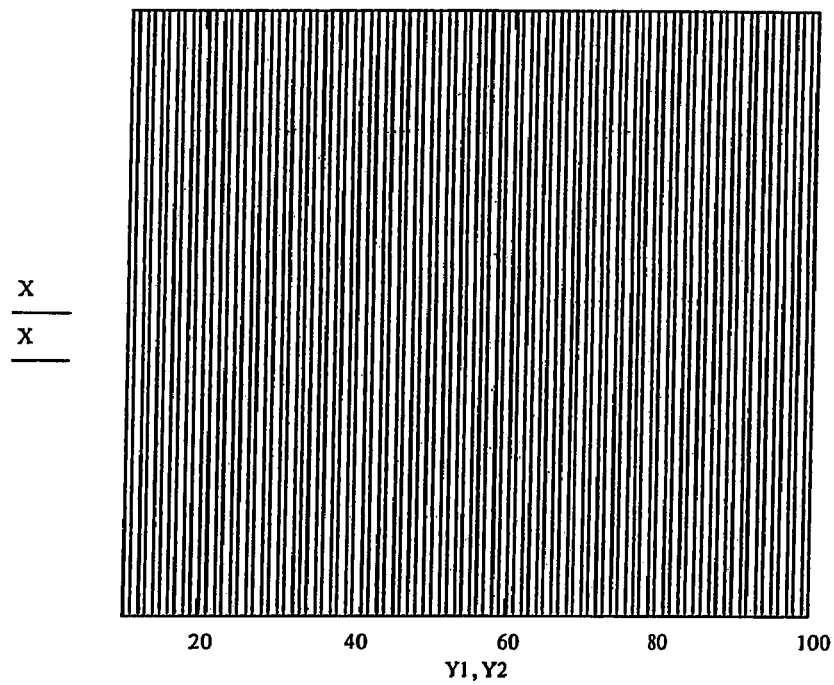

It will be apparent that the timing error can be between 0 and almost as large as a cycle of the outgoing clock. This is true because the ingoing clock is very accurate; its own reference sets the desired timing. The outgoing clock resamples this clock and thus introduces inaccuracies. FIG. 4 provides the smallest errors, since the outgoing clock is has the highest frequency. The error can thus be seen as a result of a modulo operator, operating in time, with the modulus equal to the grid of the outgoing clock.

The frequencies of the errors are clearly higher in FIG. 4. This is related to the outgoing clock 'chopping' up the ingoing clock, where smaller chop portions (smaller modulus) means higher frequencies.

Because of the modulo operator, the sampling process could be called a $0^{th}$ order noise shaping process. A delta sigma shaper uses a modulo operator and a number of integrators, in this case 0. If the outgoing clock consists of the clock regenerated by a PLL, the integrator in the PLL (VCO, CCO, DCO or such) would make the loop a $1^{st}$ order noise shaper. This gives a satisfactory link with normal delta-sigma technology. A PLL as frequency measurement means yields a better speed/accuracy product than counters.

The formula that is critical to understand the clock ratios is the following:

$$CyclePeriod2 = n*CyclePeriod1 + m*CyclePeriod1,$$
$$n \in N, \ 0 \leq m < 1$$

where CyclePeriod1 is the period of the first clock and CyclePeriod2 is the cycle of the second clock with which the first clock is sampled.

It is important to understand that the number m determines the effective rate of change. If m is very near 0 or 1, the resulting time error will slowly grow or shrink until it finally wraps around. In the time domain this would look like a sawtooth, as can already be seen from the examples. The minimum frequency of the error can be extremely low, and that frequency is influenced by both clocks.

Suppose a sampling clock for the outgoing signal of 10 MHz nominal value, and an actual error of 0 ppm. Suppose this clock samples a first reference of 1 MHz with an error of +1 ppm. The formula shows that the output sampler, which runs at a 10 times higher rate, actually perceives a fractional error of 10 ppm, namely 10 ppm of a cycle per sample. This will 'fill up' in 100.000 cycles of the reference, namely in 0.1 s. Thus the error will be sawtooth shaped, and be around 10 Hz basetone.

Suppose the same sampling clock is used to sample a 10 kHz clock again with 1 ppm error. The ratio between the numbers is now a factor 1000, so the perceived cycle error will now be 1000 ppm. This will 'fill up' in 1000 cycles, namely in 0.1 s. The frequency is still the same.

Now suppose the sampled signal is 10 Hz, 1 ppm. In 0.1 s this signal will have moved 0.1 ppm of a second, namely 100 ns. But this is identical to one sample cycle. The error will not be sawtooth shaped, but be flat. Basically the error becomes DC, meaning that the 10 MHz clock can move over 100 ns without sampling in a different pattern.

It will therefore be apparent that the spectrum of the error depends on the precise ratio of the clocks. It can vary between sawtooths and DC amongst others. It is of interest to find the best spectrum possible, which typically is high frequency. That makes the error component easy to suppress and yet accurately follow the small clock variations, which will be near DC.

Suppose that the sampled signal has a rate near 1 MHz but with a large deviation. 1 cycle is $(10+5/32)$ cycles of the 10 MHz sampling clock, namely about 1.6% from 1 MHz. The value $5/32$ guarantees that the sampling error consists of mainly high frequency terms. This is an indirect result from the Modified Engel Series, where the $5/32$ and its complement, $1-5/32=27/32$, yield mostly high frequency components. These high frequencies are simpler to filter out. For instance such numbers are simple to decimate.

This analysis suggests that the frequency of the second clock from which the first clock is sampled should be as high as possible, and that the cycle relations should be such that the number m from the equation above is an odd fraction such as $5/32$ or $27/32$. The problem though is that the typical minimum frequencies for sampling will be in the range of 10 MHz (100 ns period), whereas the typical packet rate with which timing can be transported at all will be low, for instance in the order of 10-100 packets/s. This makes the clock ratios in the order of 1 million, which is also the order of magnitude of the accuracy of the clocks. It therefore becomes difficult to trim sampling frequencies to have desirable properties.

An idea of the performance as determined by the clock ratios can be shown in a few Moiré patterns. In FIGS. 5a to 5e a number of examples is illustrated for two clocks, with a distinct ratio, which can be read from the formulas next to the actual pattern. The clocks are simple vertical lines, which depict sampling moments. The density patterns show that errors can be of relatively low frequency or higher frequency. With the help of FFT (Fast Fourier Transform) it is possible to obtain a fair picture of the best performance, and it can be shown that that is around the 32/27 ratio. The other Moiré patterns have more long term shifts, including DC. The latter is quite visible for ratios 32/32, 32/16, but also quite visible for 32/24. The Moiré examples can be tuned at any granularity.

In reality there are switches, routers and the like in a packet network, and these nodes cannot easily be slaved to the incoming clocks. There is more than one clock signal coming in, and the signals do not particularly provide information about which clock is best, and the outgoing streams are made dependent on either the global clock of the node, or the related incoming stream. This means that between two streams there will always be some kind of resampling, even if the termination points utilize PLL's. Such PLL's are then used only to enable best signal recovery possible, not for clock distribution. From node to node the number of clocks involved can and will increase, making the number of clock region transitions (much) higher than the single transition described this far.

The analysis of two clocks still holds if pairs of equipment are taken. Thus the total delay from input to output can be seen as the addition of the timing errors from all individual pairs of equipment.

The lowest clock in the chain will in general provide the worst case errors. If one piece of equipment uses an effective time grid of 8 kHz, and all the rest use 10 MHz, the 8 kHz frame rate (125 μs grid) will be dominant. Dominance will be present both in absolute time error size and spectrum.

If clock rates are comparable, the errors are probably sufficiently uncorrelated to appear as an additive process of noise. Especially when many nodes are involved this will hold. This has a direct consequence for the behaviour also in the frequency spectrum.

The variation of time grids will generally depend on the network architecture. For instance Ethernet networks are not expected to have time grids worse than 100 ns (for 10 Mbit/s Ethernet). Async networks that tunnel through TDM switches at rates of 64 kbit/s have a typical grid of 8 kHz (byte repetition rate). ATM networks may have grids of 53 bytes length (one ATM frame), meaning a time grid of 2.73 μs at a 155 MHz data rate.

The actual minimum rate that is expected for applications is the 8 kHz rate (ISDN, telephony). Much lower rates are unsuitable for current technologies.

Without measures the delay errors can be at any frequency, and of variable unknown size. This makes it very difficult to have good performance of clock regeneration without expensive means, such as high quality OCXO's (Oven Controlled Crystal Oscillators).

The modulo operators in the time domain as performed in the network are comparable to $0^{th}$ order delta sigma modulators. From other work in normal delta sigma environments it is known that the problems associated with the modulo operator can be partly overcome by adding a bit of extra information. A well known example is dithering, which improves the performance of delta-sigma converters.

In the simple example of two nodes sending to each other, the use of a PLL was discussed. It was said that for a general solution this does not improve performance, but in fact it helps to avoid the problems between the last piece of equipment and the receiving side. As such a PLL on reception side can peel off one layer, thus slightly simplifying the remaining problem. This also means that a network without switches (direct coupling, typically with cross cables) can provide excellent performance.

In accordance with the principles of the invention there is added a signal in the form of frequency or phase modulation, which can help to detect the places where the grid lines are happening, thus increasing the accuracy. A preferred solution is to combine this modulation with a PLL on receiver side so that the last added inaccuracy, between last switch and receiving side, is avoided.

The addition of a signal can take a few typical forms, based upon frequency or phase modulation. It will be understood by one skilled in the art that these terms are used loosely, as the methods are mathematically equivalent, through a one-to-one mathematical function (integration).

One such form is to provide a DC offset as an FM modulation signal, which is basically the same as a clock offset (in PM terms this equals a straight ramp). If the clocks are all around 10 MHz, and the packet rate is 1 kHz, an offset of the packet rate of $1/10000*5/32$ will be equal to shifting the sample grid by $5/32$ of a cycle of the relevant 10 MHz clock for each following sample. This will ensure that the error in the sampling by and large only carries high frequency components, and in frequency regeneration those components can easily be filtered out. This does depend a lot on actual accuracies of clocks. In the example the offset of $1/10000*5/32$ is in fact 16 ppm. If the choice is to be successful, the accuracy should be in the range of 5-25 percent, depending on required attenuation of the error components. Such a percentage means that the crystals must have relative accuracies of 16 ppm*0.05..0.25=0.8 ppm . . . 4 ppm. Typically the absolute accuracy requirements would be half this size, being 0.4 ppm . . . 2 ppm. Such crystals are quite expensive and need to be present in the actual switching elements. The accuracy requirements need to be present on every crystal in the system, including on the routers and switches within the network.

The numbers can be shifted dramatically by reducing the clock rates or increasing the packet rates. Unfortunately the expected usage of these technologies requires low packet rates, whereas the physical clock rates are quite high. The use of a DC offset is a possible, but not a preferred solution.

Some sinusoidal form of modulation can be used. This can make the acute frequency error quite large, which is favourable compared to the DC modulation. Such a modulation has the expectation not so much of a high accuracy (the acute frequency error relaxes that requirement), but of high stability. This can be expected to be true for most crystals.

In the case of crystals that are not relatively well guaranteed in stability, it can be advantageous to modulate with the summation of two sinusoidal waveforms. For instance, if some crystal has a cyclic temperature behaviour due to other elements in the switching equipment, the first sinusoidal waveform may have more or less the same rate. If such correlations occur it can be simpler to use a few frequencies, thus reducing the chance of such problems.

Depending on implementation details, the use of sawtooths, triangular signals and such may be advantageous over sinusoidal waveforms.

If the model for disturbing the stabilities is best seen as noisy (due to the number of sources, due to the relative terra incognita) it may be best to use (pseudo) random modulation.

For all modulation types it is possible to state something about the modulation speed (dictated by the packet rate) and detection speed. This should be in balance with the stability of the clocks. If that is not reached yet, either the packet rate should go up or the clocks should become more stable. Since the latter is not a real option with intervening switches and routers present, modification of the packet rate is believed to be the best solution.

In fact the system allows for a mix of methods to be used. Each modulation is best with the sending side sending precise information about the modulation to the receiving sides. In doing that the receiving side receives extra information that can be used to more accurately restore the actual desired clock. But by sending the information over the receiving side will basically convey everything of interest about the modulation. Thus the choice of modulation becomes a matter of sender only.

The type, modulation depth etc. can be determined by the sender on basis of the expected network conditions, clock stabilities and such. Typical implementation of such functionality is best done with either human intervention or a automatic system that on one side collects specific data from the receivers and feeds/sets the sender with its conclusions.

Figure 6:
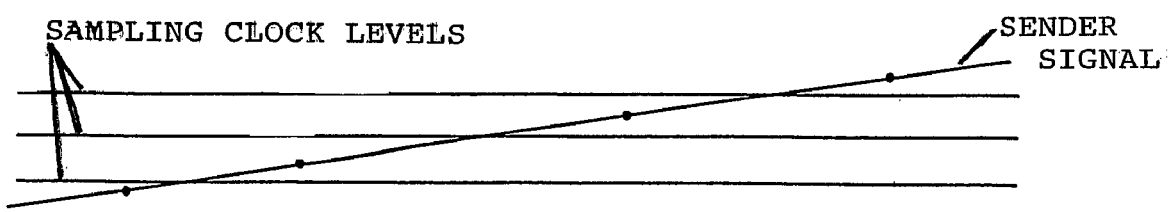
FIG. 6 illustrates the mathematics of a small piece of modulated signal.
Figure 7:
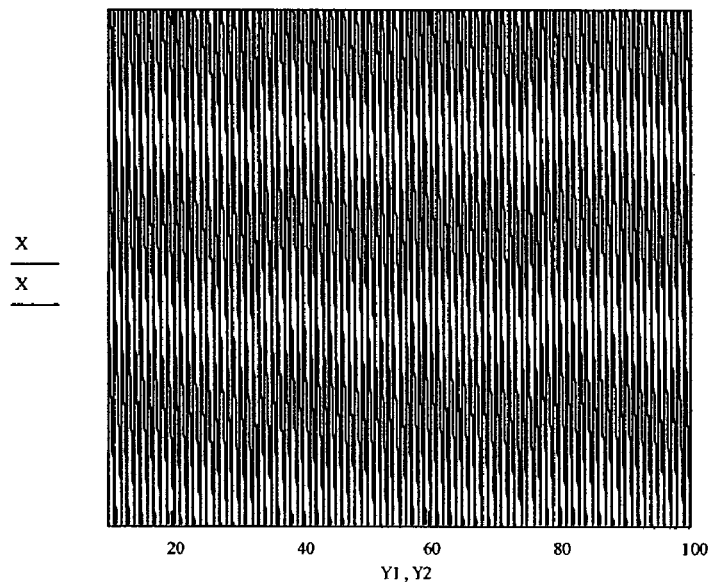
FIG. 7 illustrates a Moiré pattern if the line of FIG. 6 is less tilted.

FIG. 6 shows how a small piece of modulated signal provokes transitions of the sender signal (tilted line, for PM a ramp or for FM a DC offset) through extra quantization levels of the sampling clock (horizontal lines). The horizontal lines indicate where the received signal will be seen, as in a truncation function. The type of truncation function, floor or ceiling, depends on in which direction time actual flows, upwards (then: ceiling) or downwards (then: floor). The truncation function is equal to a type of modulo function. If the tilted line shifts up or downwards and the readings after the truncation do not change, the receiver cannot make any distinction between the original and shifted version: the truncation drops that information. Thus the maximum shift that the tilted line can shift up and down is a direct indication of the minimum uncertainty (read: error) that can be guaranteed at the receiver. A larger shift will change one or more truncated values, and thus will be detectable. Thus this minimum uncertainty is also the theoretical maximum.

Finding a precise uncertainty boundary can be helped with tools based upon these Moiré patterns. Such patterns can take along the modulation, so that one of the line sets becomes tilted. This changes the one dimensional Moiré pattern into a two dimensional pattern as shown in FIG. 2 with time (normal progressing time) in one direction and time (modulation over time) in the other. From such a pattern it becomes possible to calculate needed observation window and achievable accuracy (this is simple linear maths). Making the tilted line tilt less may give higher accuracy, but will require longer observation.

Figure 8:
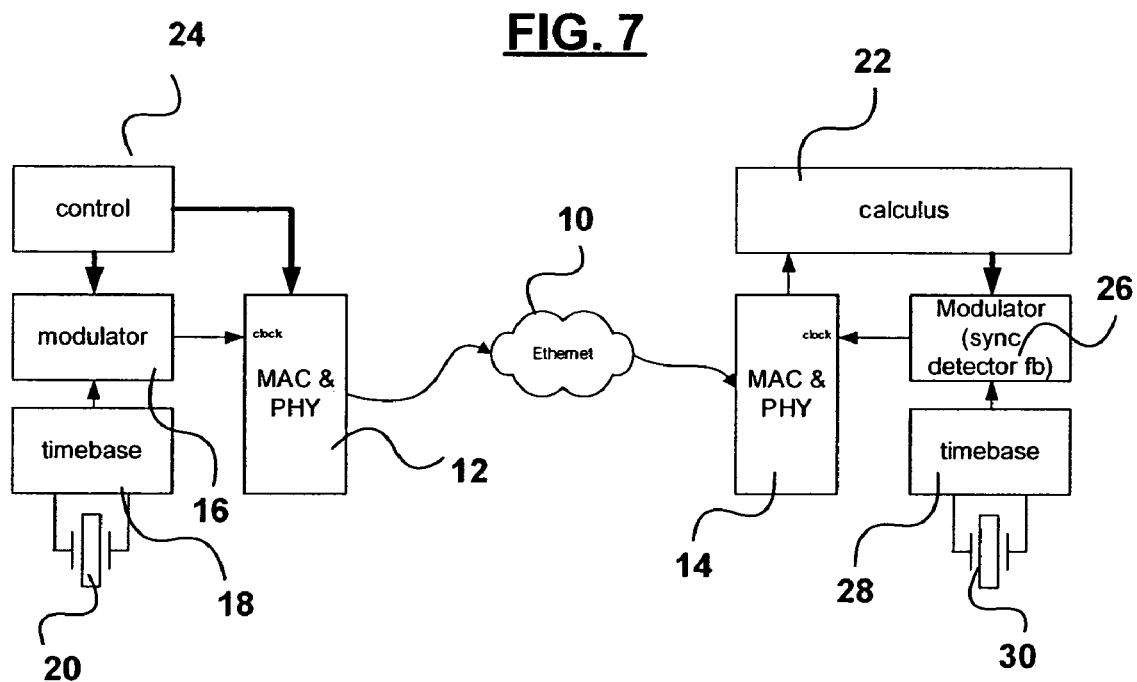
FIG. 8 illustrates a schematic of an Ethernet environment solution.

A practical embodiment implementing the above methods can be constructed in a number of ways that are direct derivations from line equations. One embodiment is shown in FIG. 8, which depicts a solution for an Ethernet environment. The system comprises an Ethernet 12 connected on the sending and receiving sides to Ethernet MAC & PHY units 12, 14. A modulator 16 provides an input on to the sending unit 12. The asynchronous timing packets are handled such that the time of departure or arrival of some packet or event is the main data upon which the complete solution operates. The modulation of the actual departure time can be performed in a number of ways. The modulator provides a timing signal for the unit 12. A time base 18 provides an input to the modulator 16. The modulator 16 works as a deviation in time from the existing timebase 18. Typically a crystal 20 provides the base signal. Since the modulator 16 creates a time shift, a phase modulator may be most suitable. If an infinite phase ramp is required, the modulator needs to have provisions for that.

The Ethernet MAC & PHY unit 14 handles the async traffic in the receiver. This may use either an independent clock or a feedback clock. In FIG. 8 the unit 14 uses a feedback clock, but by disabling the modulator or multiplying the modulator data in the calculus block 22 by 0, the clock can be made independent.

A control unit 24 controls the precise timing of departure of packets on the sender side. The modulation that the control causes is preferably done in the interval between packets. Modulation of the actual packet rate may be possible, but will influence the nominal duration of the message and each bit in that message. For deep modulation that is not acceptable, so that only modulation during pauses may be acceptable.

The control unit 24 might modulate during messages. This has no purpose when the sender communicates with a switch, which will use its own clock on the outgoing streams, but may have an advantage when the receiving node could be a end node. Since the end node will be able to act upon the extra modulation, the performance can be made better.

The calculus unit 24 on the receiver side is used to yield more accuracy about where the quantization boundaries were, so that they can be cancelled. If a physical, recovered signal is required, the calculus unit 22 is needed to provide the extra accuracy, but that signal should typically not be modulated. This requires additional circuitry, which is not shown.

The receiving side also includes a modulator and sync detector 26 and its own timebase 28 with crystal 30.

FIG. 8 shows the most complete implementation, but it will be understood by persons skilled in the art that it certain elements may be removed, depending on modulation depth, traffic bit rate accuracy and like. The most complex element in the above figure is the synchronous detection feedback signal, which can be used to precise time the actual arrival of a packet.

We claim:

1. A method of recovering timing information over multiple asynchronous packet networks, each having its own time grid, comprising:

transmitting timestamped packets between a sender on a first said network and a receiver on a second said network;

transporting timing information between the sender and receiver as a modulated signal comprising a modulation in the rate of sending out the timestamped packets transmitted between the sender and receiver;

extracting said timing information from the packets arriving at the receiver; and using said timing information at the receiver to align the time grid at the receiver with the time grid at the sender; and wherein said modulated signal is manifested as an offset in the rate of transmission of packets from the sender, said offset being an odd fraction $f$ of a cycle of a clock signal such that the timing error at the receiver contains only high frequency components, and wherein the packet rate is offset by an amount equal to the ratio of the packet cycle and clock cycle multiplied by $f$.

2. The method of claim 1, wherein said modulated signal is frequency or phase modulated.

3. The method of claim 1, wherein a phase locked loop is provided at the receiver to remove timing errors arising between the last node in the path of a packet across the network and the receiver.

4. The method of claim 1, wherein said modulated signal uses sinusoidal modulation.

5. The method of claim 1, wherein said modulated signal is the summation of two sinusoidal waveforms.

6. The method of claim 1, wherein said modulated signal uses a sawtooth or form of modulation.

7. The method of claim 1, wherein said modulated signal uses pseudo-random modulation.

8. A method of recovering timing information in a packet network, wherein a modulated signal is used to transport additional information required for clock recovery between the sender and receiver across the network, wherein said modulated signal is manifested as an offset in the rate of transmission of packets from the sender, said offset being an odd fraction $f$ of a cycle of a clock signal such that the timing error at the receiver contains only high frequency components, and wherein the packet rate is offset by an amount equal to the ratio of the packet cycle and clock cycle multiplied by $f$.

9. The method of claim 8, wherein $f$ is $5/32$.

10. The method of claim 8, wherein $f$ is $27/32$.

11. The method of claim 8, wherein said high frequency components are filtered out at the receiver.

12. In a packet network linking a sender and receiver, an apparatus for recovering timing information across the network at the receiver comprising:

a modulator at the sender for sending a modulated signal across the network conveying timing information; and a clock recovery unit at the receiver using said modulated signal to improve the accuracy of the recovered clock; and a control unit coupled to said modulator for varying the precise time of departure of outgoing packets to provide said modulated signal, said control unit varying the time of transmission of said packets to provide an offset in rate the transmission of said packets, wherein said offset is an odd fraction $f$ of a cycle of a clock signal such that the timing error at the receiver contains only high frequency components; and wherein the packet rate is offset by an amount equal to the ratio of the packet cycle and clock cycle multiplied by $f$.

13. The apparatus as claimed in claim 12 wherein said recovery unit includes a synchronous detector for determining the precise time of arrival of an incoming packet.

14. The apparatus as claimed in claim 13, wherein the sender and receiver each include a local timebase as a reference.

15. The apparatus as claimed in claim 12 wherein said modulator is connected to a network interface unit.

16. The apparatus of claim 12, wherein $f$ is $5/32$.

17. The apparatus of claim 12, wherein $f$ is $27/32$.

18. The apparatus of claim 12 further comprising a phase locked loop at the receiver for removing errors arising in the last link of the network before the receiver.

* * * * *